(12) United States Patent
Shibanuma et al.

(10) Patent No.: US 12,355,262 B2
(45) Date of Patent: Jul. 8, 2025

(54) CONTACTLESS POWER TRANSMISSION APPARATUS AND ADJUSTMENT METHOD THEREOF

(71) Applicant: DENSO CORPORATION, Kariya (JP)

(72) Inventors: Mitsuru Shibanuma, Kariya (JP);
Masaya Takahashi, Kariya (JP);
Eisuke Takahashi, Kariya (JP);
Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/369,490

(22) Filed: Sep. 18, 2023

(65) Prior Publication Data

US 2024/0006923 A1   Jan. 4, 2024

Related U.S. Application Data

(63) Continuation of application No. PCT/JP2022/007598, filed on Feb. 24, 2022.

(30) Foreign Application Priority Data

Mar. 26, 2021 (JP) ................. 2021-053141

(51) Int. Cl.
*H02J 50/12* (2016.01)
*H02J 1/02* (2006.01)
*H02J 50/40* (2016.01)

(52) U.S. Cl.
CPC ............. *H02J 50/12* (2016.02); *H02J 1/02* (2013.01); *H02J 50/40* (2016.02); *H02J 50/402* (2020.01)

(58) Field of Classification Search
CPC . B60L 53/122; H02J 1/02; H02J 50/10; H02J 50/12; H02J 50/40; H02J 50/402
See application file for complete search history.

(56) References Cited

U.S. PATENT DOCUMENTS 11,916,404 B1 *   2/2024   Pries ..................... B60L 53/122
2009/0243397 A1 *  10/2009   Cook ..................... H02J 50/80
                                                        307/104

(Continued)

FOREIGN PATENT DOCUMENTS

CN      110 048 520 A    7/2019
JP      2016-192856 A    11/2016

*Primary Examiner* — Levi Gannon
(74) *Attorney, Agent, or Firm* — Oliff PLC

(57) ABSTRACT

A power transmission apparatus supplies power to a power reception apparatus without contact therebetween. The power transmission apparatus includes: a power conversion unit that outputs an alternating-current voltage of a predetermined frequency; a power transmission unit that has a power transmission coil and a capacitor that is connected to the power transmission coil; a transmission line that connects the power conversion unit and the power transmission unit; and a compensator that is disposed between the power conversion unit and the transmission line. The compensator includes: an inductive reactance element that has an inductive reactance that is greater than an inductive reactance of the transmission line; and a capacitor that reduces an inductive reactance that is a sum of an inductive reactance of the transmission line and an inductive reactance of the inductive reactance element. The inductive reactance element and the capacitor are connected.

18 Claims, 13 Drawing Sheets

(56) References Cited

U.S. PATENT DOCUMENTS

| | | | |
|---|---|---|---|
| 2011/0025132 A1* | 2/2011 | Sato | H01Q 1/2225 |
| | | | 307/104 |
| 2011/0285210 A1* | 11/2011 | Lemmens | H02J 7/007182 |
| | | | 307/104 |
| 2014/0092649 A1* | 4/2014 | Hsu | H02J 50/12 |
| | | | 307/104 |
| 2015/0239354 A1* | 8/2015 | Gorai | B60L 53/12 |
| | | | 307/10.1 |
| 2017/0222484 A1* | 8/2017 | DeBaun | H02J 50/12 |
| 2017/0288446 A1* | 10/2017 | Elkhouly | H02J 50/60 |
| 2019/0165614 A1* | 5/2019 | Afridi | H02M 7/23 |
| 2020/0177028 A1* | 6/2020 | Esteban | H02M 1/4208 |
| 2020/0195043 A1* | 6/2020 | K | H02J 50/12 |
| 2023/0146550 A1* | 5/2023 | Nunoya | H02J 50/90 |
| | | | 307/104 |

\* cited by examiner

US 12,355,262 B2

CONTACTLESS POWER TRANSMISSION APPARATUS AND ADJUSTMENT METHOD THEREOF

CROSS-REFERENCE TO RELATED APPLICATION

The present application is a continuation application of International Application No. PCT/JP2022/007598, filed on Feb. 24, 2022, which claims priority to Japanese Patent Application No. 2021-053141, filed on Mar. 26, 2021. The contents of these applications are incorporated herein by reference in their entirety.

BACKGROUND

Technical Field

The present disclosure relates to a contactless (wireless) power transmission apparatus and an adjustment method thereof.

Related Art

A power transmission apparatus that transmits power to a power reception apparatus without contact therebetween is known. This power transmission apparatus is provided with a capacitor between a high-frequency power supply apparatus and a transmission line that connects the high-frequency power supply apparatus and a power transmission coil, the capacitor being provided to suppress a reactance component of impedance of the transmission line from affecting an output current outputted from the power reception apparatus.

SUMMARY

One aspect of the present disclosure provides a power transmission apparatus that supplies power to a power reception apparatus without contact therebetween. The power transmission apparatus includes: a power conversion unit that outputs an alternating-current voltage; a power transmission unit that has a power transmission coil and a capacitor that is connected to the power transmission coil; a transmission line that connects the power conversion unit and the power transmission unit; and a compensator that is disposed between the power conversion unit and the transmission line. The compensator includes an inductive reactance element that has an inductive reactance that is greater than an inductive reactance of the transmission line; and a capacitor that reduces an inductive reactance that is a sum of the inductive reactance of the transmission line and the inductive reactance of the inductive reactance element. The inductive reactance element and the capacitor are connected.

DESCRIPTION OF THE EMBODIMENTS

Figure 1:
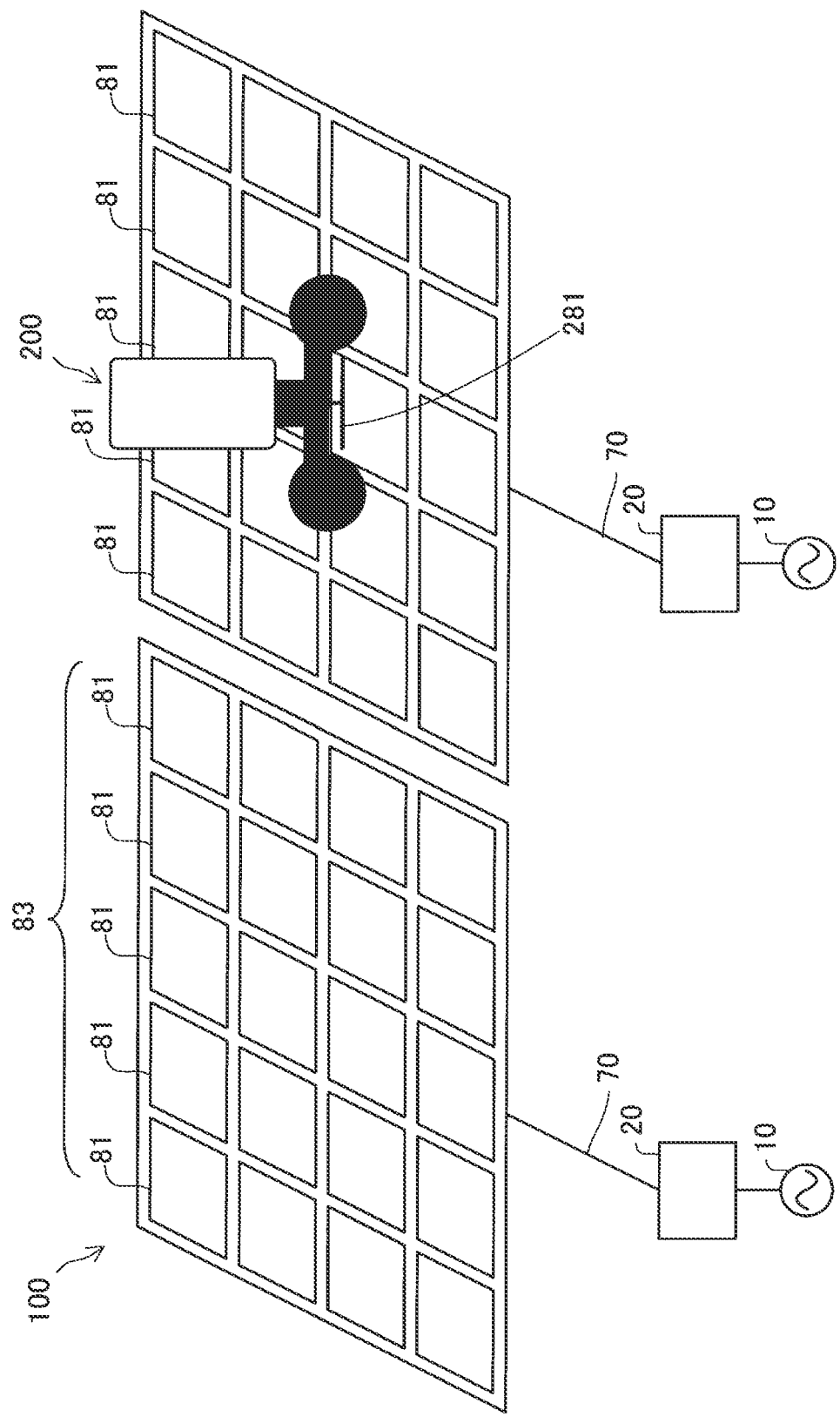
FIG. 1 is an explanatory diagram illustrating a power transmission apparatus for a micromobility device that is a power reception apparatus.

JP 2016-192856 A discloses a power transmission apparatus that transmits power to a power reception apparatus without contact therebetween. The power transmission apparatus in JP 2016-192856 A is disclosed as being provided with a capacitor between a high-frequency power supply apparatus and a transmission line that connects the high-frequency power supply apparatus and a power transmission coil, the capacitor being provided to suppress a reactance component of impedance of the transmission line from affecting an output current outputted from the power reception apparatus.

However, reactance of the transmission line is affected by a shape of the transmission line and by a surrounding environment. Therefore, the reactance component of the impedance of the transmission line affecting the output current outputted from the power reception apparatus cannot be sufficiently suppressed simply by a capacitor being provided. In addition, although providing a capacitor that has an appropriate capacitance is necessary, because the reactance (+jωL) of the transmission line is not large, if the reactance of the transmission line is canceled out by reactance of the capacitor, a problem occurs in that a capacitor $(1/\omega^2 L)$ that has a large capacitance is necessary.

An exemplary embodiment of the present disclosure provides a power transmission apparatus that supplies power to a power reception apparatus without contact therebetween is provided. The power transmission apparatus includes: a power conversion unit that outputs an alternating-current voltage; a power transmission unit that has a power transmission coil and a capacitor that is connected to the power transmission coil; a transmission line that connects the power conversion unit and the power transmission unit; and a compensator that is disposed between the power conversion unit and the transmission line. The compensator includes an inductive reactance element that has an inductive reactance that is greater than an inductive reactance of the transmission line; and a capacitor that reduces an inductive reactance that is a sum of the inductive reactance of the transmission line and the inductive reactance of the inductive reactance element. The inductive reactance element and the capacitor are connected.

According to this exemplary embodiment, the inductive reactance of the transmission line can be substantially ignored as a result of the inductive reactance element having the inductive reactance that is greater than the inductive reactance of the transmission line being provided. Consequently, effects of changes in the inductive reactance caused by changes in a shape of the transmission line and the like can be avoided. In addition, as a result of the inductive reactance element being provided, a capacitance of the capacitor that is required to: cancel out the inductive reactance that is the sum of the transmission line and the inductive reactance element; and reduce reactance at a predetermined frequency can be reduced.

The present disclosure will be further clarified through the detailed description herebelow, with reference to the accompanying drawings.

First Embodiment

FIG. 1 is an explanatory diagram of a power transmission apparatus 100 for a micromobility device 200 that includes a power reception apparatus. The power transmission apparatus 100 includes an alternating-current power supply 10, a power conversion unit 20, and a power transmission coil 81. According to the present embodiment, the power transmission coil 81 is arranged in a 4×5 matrix and configures a coil unit 83. The power conversion unit 20 and the power transmission coil 81 are connected by a transmission line 70. For example, the micromobility device 200 may be a conveyance device that conveys parts and the like in a factory. The micromobility device 200 includes a power reception coil 281. The micromobility device 200 receives power from the power transmission coil 81 without contact therebetween using the power reception coil 281 and moves within the factory.

Figure 2:
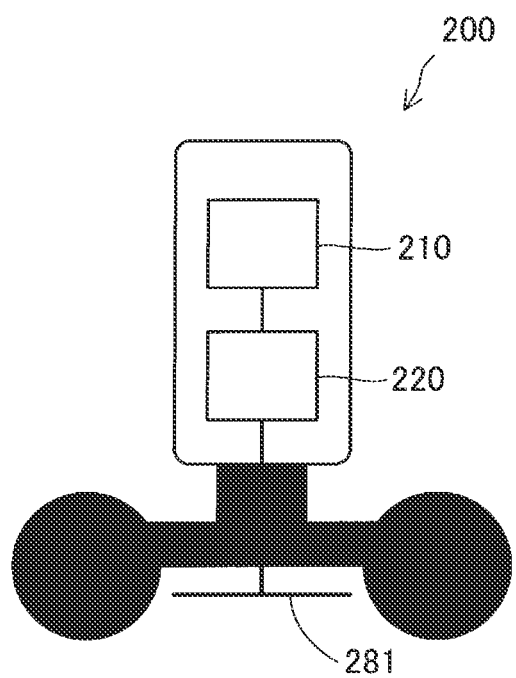
FIG. 2 is an explanatory diagram illustrating the micromobility device.

FIG. 2 is an explanatory diagram of the micromobility device 200. The micromobility device 200 includes a battery 210, a power conversion unit 220, and the power reception coil 281. The power reception coil 281 is electromagnetically coupled with the power transmission coil 81 and receives alternating-current power from the power transmission coil 81. The power conversion unit 220 converts the alternating-current power received by the power reception coil 281 to direct current. For example, the power conversion unit 220 may include a bridge rectification circuit and a smoothing capacitor (not shown). The battery 210 stores the power that has been converted to direct current by the power conversion unit 220. The power stored in the battery 210 is used as power for operating the micromobility device 200.

Figure 3:
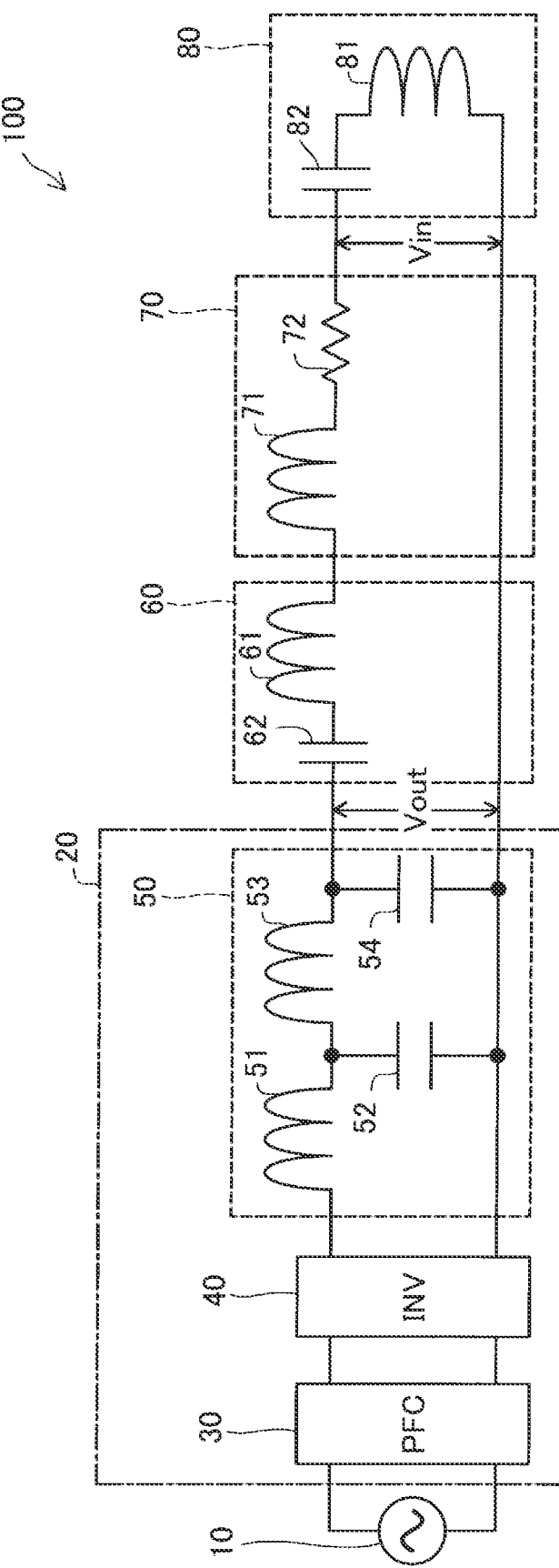
FIG. 3 is an equivalent circuit diagram of the power transmission apparatus.

FIG. 3 is an equivalent circuit diagram of the power transmission apparatus 100. The power transmission apparatus 100 includes the alternating-current power supply 10, the power conversion unit 20, a compensator 60, the transmission line 70, and a power transmission unit 80. The power conversion unit 20 is a device that generates an alternating-current voltage and supplies the alternating-current voltage to the power transmission unit 80 through the transmission line 70. The power conversion unit 20 includes a power factor improvement circuit 30, an inverter 40, and a filter 50. The power factor improvement circuit 30 is a circuit that suppresses harmonic currents generated in an input current supplied from the alternating-current power supply 10 and brings a power factor closer to 1. The inverter 40 converts a direct-current voltage to alternating current of a predetermined frequency, such as 85 kHz. The filter 50 has a configuration in which an L-type filter configured by a coil 51 and a capacitor 52, and an L-type filter configured by a coil 53 and a capacitor 54 are connected in series.

The transmission line 70 is formed by a pair of conducting wires. The transmission line 70 has an electrical resistance r72 and an inductance L71. In FIG. 3, the electrical resistance r72 and the inductance L71 are shown as a resistor 72 and a coil 71 using circuit diagram symbols for a resistor and a coil. The power transmission unit 80 includes a transmission coil 81 and a capacitor 82 that are connected in series. The compensator 60 includes a coil 61 that is an inductive reactance element and a capacitor 62 that is a capacitive reactance element connected in series between the power conversion unit 20 and the transmission line 70. The compensator 60 will be described in detail below.

Figure 4:
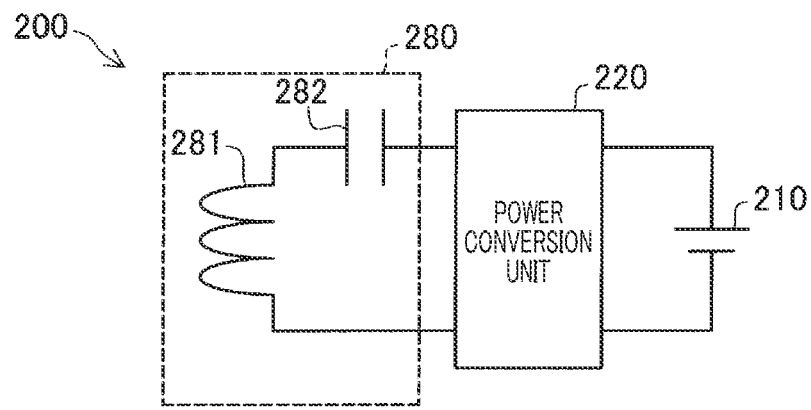
FIG. 4 is an equivalent circuit diagram of the micromobility device.

FIG. 4 is an equivalent circuit diagram of the micromobility device 200. The micromobility device 200 includes a power reception unit 280, the power conversion unit 220, and the battery 210. The power reception unit 280 includes the power reception coil 281 and a capacitor 282 that are connected in series.

Figure 5:
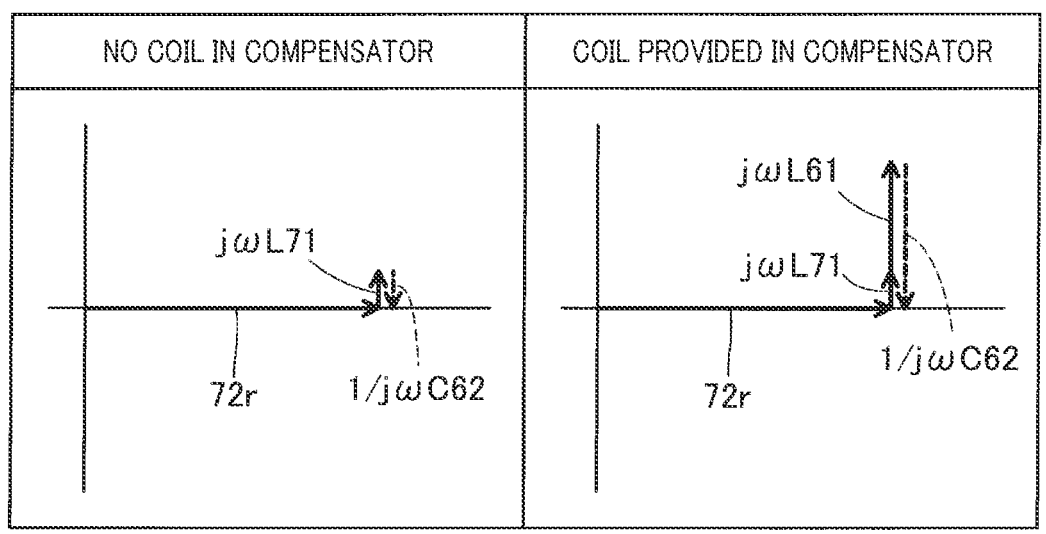
FIG. 5 is an explanatory diagram illustrating reactance of a transmission line and each constituent element of a compensator shown on a Gauss plane.

FIG. 5 is an explanatory diagram of the reactance of the transmission line 70 and each constituent element of the compensator 60 shown on a Gauss plane. On the Gauss plane, a real axis indicates electrical resistance and an imaginary axis indicates reactance. A vector in a positive direction on the imaginary axis is inductive reactance and a vector in a negative direction on the imaginary axis is capacitive reactance. In addition, a positive side on the imaginary axis is an inductive reactance region and a negative side is a capacitive reactance region.

The compensator 60 suppresses effects of inductive reactance attributed to the inductance L71 of the transmission line 70. As described above, the compensator 60 includes the coil 61 that is the inductive reactance element and the capacitor 62 that is the capacitive reactance element. First, a case in which the coil 61 is not provided will be considered. The capacitor 62 cancels out an inductive reactance ($j\omega L71$) attributed to the inductance L71 of the transmission line 70 using a capacitive reactance ($1/(j\omega C62)$) of the capacitor 62. $\omega$ represents frequency.

When a frequency of the alternating-current voltage generated by the power conversion unit 20 is f, $\omega=2\pi f$. The inductance L71 of the transmission line 70 changes merely by slight changes in the shape of the transmission line 70. When the shape of the transmission line 70 changes, the inductance L71 changes, the reactance changes, and the impedance changes. Therefore, worsening of transmission efficiency is suppressed by the capacitance of the capacitor 62 being changed in accompaniment with changes in the shape of the transmission line 70. When alternating-current power is sent from the power conversion unit 20 to the power transmission unit 80, loss in the transmission line 70 midway to the power transmission unit 80 is required to be minimized.

When the compensator 60 is not provided and only the transmission line 70 is provided between the power conversion unit 20 and the power transmission unit 80, the coil 71 of the transmission line 70 and the capacitor 62 preferably reduce the inductive reactance of the transmission line 70 and meet, as much as possible, a resonance condition shown in a following expression. Specifically, $$j\omega L71 + 1/(j\omega C62) \approx 0$$

or $$j(\omega L71 - 1/(\omega C62)) \approx 0$$

is preferably met. Hereinafter, the condition for practical resonance being met, including when both sides are equal or substantially equal in the above-described expressions, is referred to as the inductive reactance $(1/j\omega C62)$ being canceled out by the capacitive reactance $(j\omega L71)$.

In the present disclosure, the compensator 60 includes the coil 61 and the capacitor 62 that are connected in series to the transmission line 70. As a result of the coil 61, an inductance that is a sum of the inductance L71 of the transmission line 70 and an inductance L61 of the coil 61 of the compensator 60 is increased. As a result, an inductive reactance $(j\omega(L71+L61))$ increases. The inductive reactance $(j\omega(L71+L61))$ is reduced using the capacitive reactance $(1/(j\omega C62))$ of the capacitor 62 of the compensator 60 and canceled out.

Here, if the inductance L61 of the coil 61 of the compensator 60 is sufficiently greater than the inductance L71 of the transmission line 70, such as the inductance L61 being about five to ten times the inductance L71, the inductive reactance is $j\omega L71 \ll j\omega L61$. As a result, the inductive reactance $(j\omega(L71+L61))$ that is the sum of the transmission line 70 and the compensator 60 is substantially the inductive reactance $(j\omega L61)$ of the coil 61. Consequently, even if a change occurs in the shape of the transmission line 70, effects of the inductance L71 of the transmission line 70 can be ignored.

A capacitance C62 of the capacitor 62 that is required to exactly cancel out the inductive reactance is $1/(\omega L71)$. When the compensator 60 is not provided with the coil 61, the inductive reactance $(j\omega L71)$ attributed to the inductance L71 of the transmission line 70 is small. Therefore, the capacitance C62 of the capacitor 62 becomes significantly large. Meanwhile, when the compensator 60 is provided with the coil 61, the capacitance C62 of the capacitor 62 of the compensator 60 may be $1/(\omega^2(L71+L61))$. Therefore, the capacitance C62 of the capacitor 62 can be less than that when the coil 61 of the compensator 60 is not provided. In addition, when L71≪L61, the effects of the inductance L71 of the transmission line 70 can be substantially ignored. Therefore, the capacitance of the capacitor 62 can be determined taking into consideration only the inductance of the coil 61 of the compensator 60.

As described above, according to the first embodiment, the compensator 60 has the inductive reactance element (coil 61) and the capacitor 62 that are connected in series, the inductive reactance element having the inductive reactance $(j\omega L61)$ that is greater than the inductive reactance $(j\omega L71)$ of the transmission line 70. Therefore, the inductive reactance of the transmission line 70 can be substantially ignored and the inductive reactance of the coil 61 can be canceled out by the capacitive reactance of the capacitor 62. As a result, the effects of changes in the inductive reactance caused by changes in the shape of the transmission line 70 and the like can be avoided.

In addition, the capacitance of the capacitor 62 required to cancel out the inductive reactance $(j\omega L71)$ of the transmission line 70 when the coil 61 is not provided is $1/(\omega^2 L71)$, and the capacitance of the capacitor 62 required to cancel out the inductive reactance $(j\omega)(L71+L61))$ of the transmission line 70 and the compensator 60 when the coil 61 is provided is $1/(\omega^2(L71+L61))$. Therefore, when the coil 61 is provided, the capacitance of the capacitor 62 can be less than that when the coil 61 is not provided.

When the inductive reactance of the transmission line 70 and the compensator 60 can be canceled out by the capacitive reactance of the capacitor 62, because the transmission line 70 and the compensator 60 are resonating, an effective value (hereinafter referred to as an "output voltage effective value Veout") of an output voltage Vout outputted from the power conversion unit 20 and an effective value (hereinafter referred to as an "input voltage effective value Vein") of an input voltage Vin inputted to the power transmission unit 80 are substantially equal. Here, more accurately, the input voltage effective value Vein drops from the output voltage effective value Veout by an amount amounting to the electrical resistance r72 of the transmission line 70.

Therefore, the inductance of the coil 61 and the capacitance of the capacitor 62 of the compensator 60 can be prescribed such that (Veout−Vein) is a minimum. For example, at an adjustment stage, voltmeters may be disposed in an output portion of the power conversion unit 20 and an input portion of the transmission unit 80. The output voltage effective value Veout and the input voltage effective value Vein may be measured while the capacitance of the capacitor 62 is changed, and the capacitance of the capacitor 62 at which (Veout−Vein) is a minimum may be determined. The voltmeters may subsequently be removed.

Second Embodiment

Figure 6:
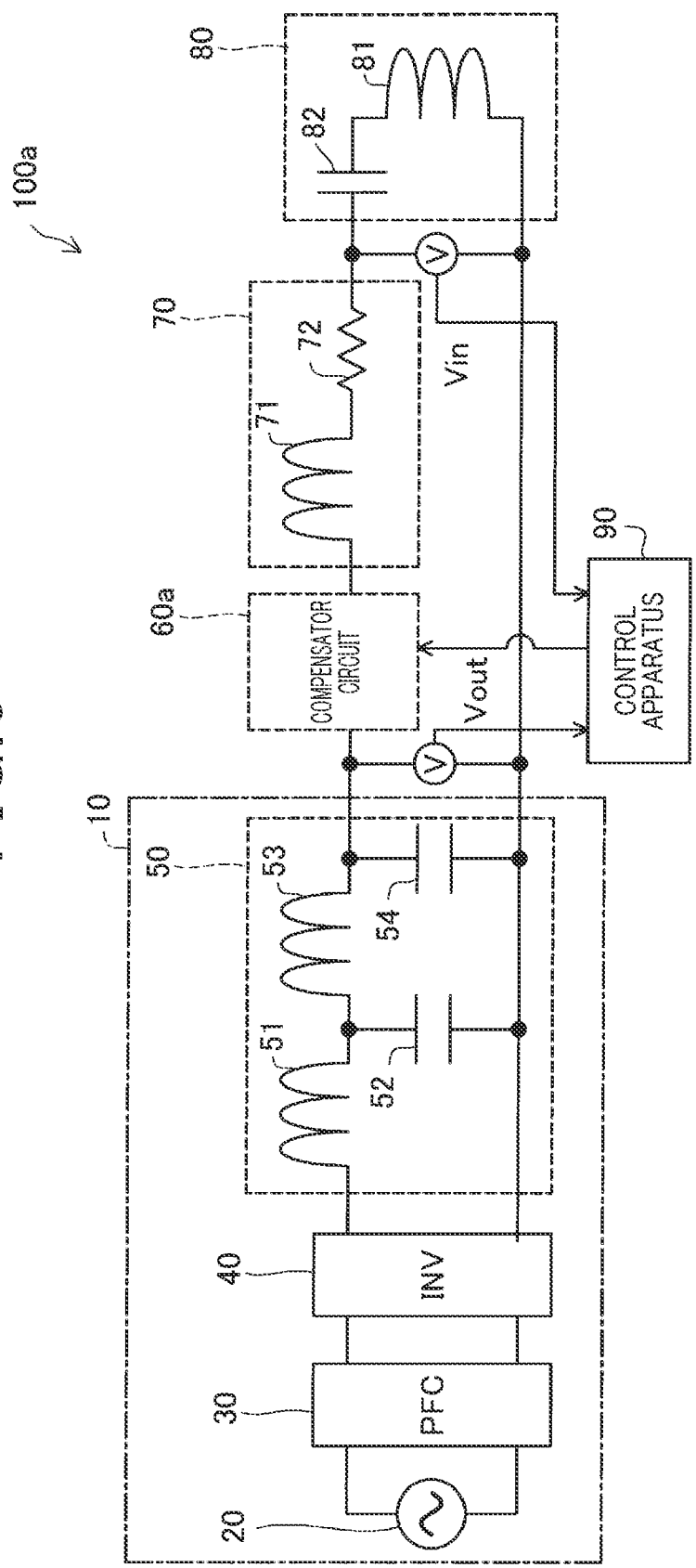
FIG. 6 is an equivalent circuit diagram of the power transmission apparatus.

FIG. 6 is an equivalent circuit diagram of a power transmission apparatus 100*a*. According to the first embodiment, the inductance L61 of the coil 61 and the capacitance C62 of the capacitor 62 of the compensator 60 are manually determined. However, a second embodiment differs in that the control apparatus 90 automatically sets a capacitance C62*a* of a capacitor 62*a* of a compensator 60*a* using the output voltage effective value Veout and the input voltage effective value Vein.

Figure 7:
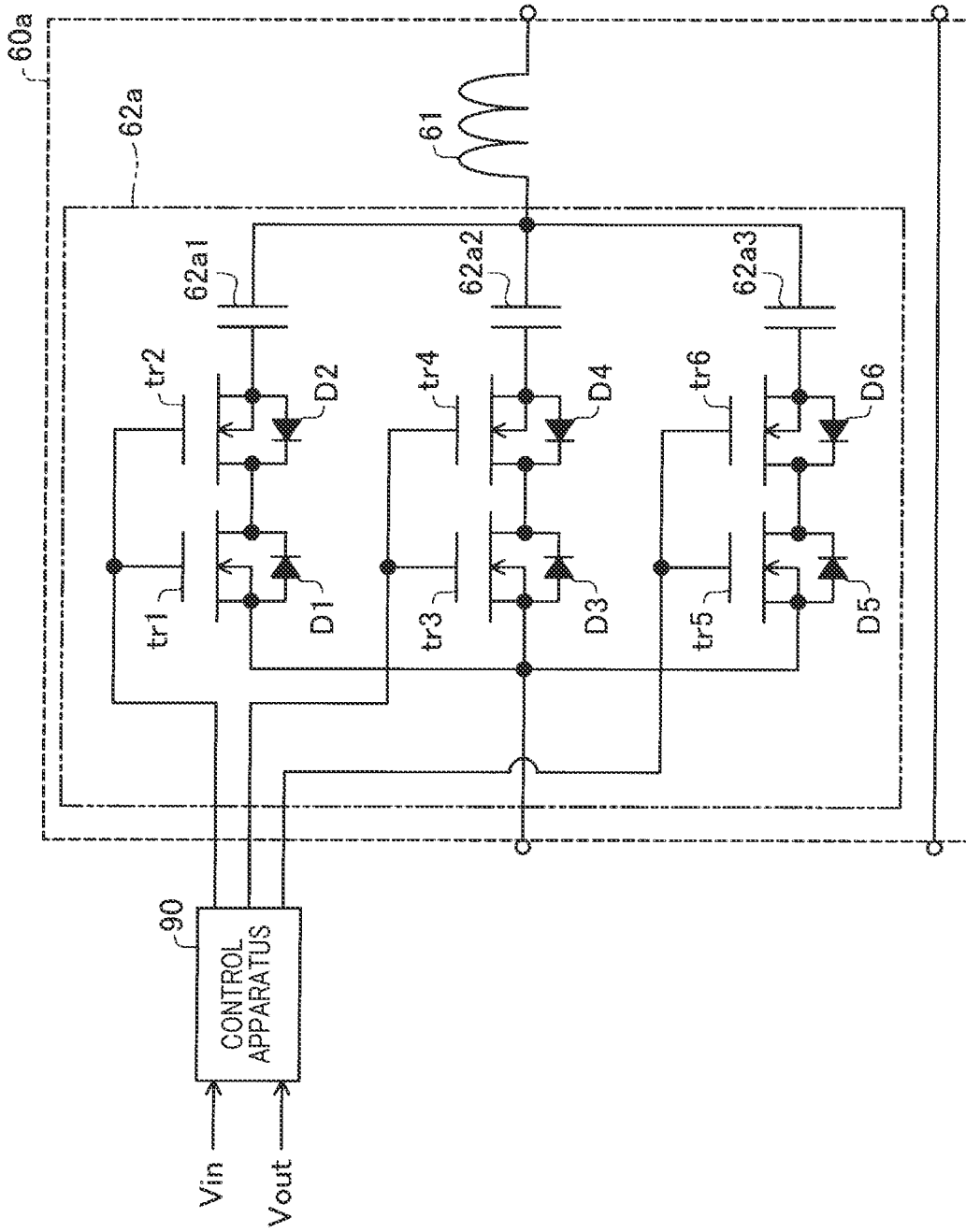
FIG. 7 is a circuit diagram of the compensator.

FIG. 7 is a circuit diagram of the compensator 60*a*. The compensator 60*a* includes the coil 61 and the capacitor 62*a* that are connected in series. The capacitor 62*a* includes three capacitors 62*a*1, 62*a*2, and 62*a*3, switching transistors tr1 to tr6 that are semiconductor switches formed by metal-oxide field-effect transistors (MOS-FETs), and diodes D1 to D6. The diodes D1 to D6 are connected in parallel between drains and sources of the switching transistors tr1 to tr6. The diodes D1, D3, and D5 and the diodes D2, D4, and D6 are connected to have opposite conduction directions. The capacitor 62*a*1 and the switching transistors tr1 and tr2 are connected in series. The capacitor 62*a*2 and the switching transistors tr3 and tr4 are connected in series, and connected in parallel to the capacitor 62*a*1 and the switching transistors tr1 and tr2. In addition, the capacitor 62*a*3 and the transistors tr5 and tr6 are connected in series, and connected in parallel to the capacitor 62*a*1 and the switching transistors tr1 and tr2.

The switching transistors tr1 and tr2 are simultaneously turned on and off. When the switching transistors tr1 and tr2 are on, an alternating-current voltage is applied to the compensator 60*a*. Therefore, when the filter 50 side has a higher voltage than the transmission line 70 side, a current flows from the filter 50 to the transmission path 70 through the switching transistor tr1, the diode D1, and the switching transistor tr2. Conversely, when the transmission line 70 side has a higher voltage than the filter 50 side, the current flows from the transmission line 70 to the filter 50 through the switching transistor tr2, the diode D2, and the switching transistor tr1. That is, a charging/discharging current flows to the capacitor 62*a*.

Meanwhile, when the switching transistors tr1 and tr2 are off, when the filter 50 side has a higher voltage than the transmission line 70 side, a current does not flow to the transistor Tr2 and the diode D2. When the transmission line 70 side has a higher voltage than the filter 50 side, the current does not flow to the transistor Tr1 and the diode D1. Therefore, a current does not flow between the filter 50 and the transmission line 70. That is, the charging/discharging current does not flow to the capacitor 62a1. This similarly applies to the switching transistors tr3 and tr4, the diodes D3 and D4, and the capacitor 62a2. This also similarly applies to the switching transistors tr5 and tr6, the diodes D5 and D6, and the capacitor 62a3.

The control apparatus 90 determines the switching transistor to be turned on and the switching transistor to be turned off among the switching transistors tr1 to tr6 based on the output voltage effective value Veout and the input voltage effective value Vein, and determines the capacitor that is connected in series to the coil 61.

Here, the control apparatus 90 is connected to at least one of the capacitors 62a1, 62a2, and 62a3. Capacities C62a1, C62a2, and C62a3 of the capacitors 62a1, 62a2, and 62a3 may be the same capacitance or differing capacities. For example, a capacitance ratio may be C62a1:C62a2:C62a3=1:2:4. In this case, when the control apparatus 90 turns on only the switching transistors tr1 and tr2, only the capacitor 62a1 is connected and the capacitance of the capacitor 62a connected to the coil 61 is a minimum.

In addition, when the control apparatus 90 turns on all of the switching transistors tr1 to tr6, the capacitors 62a1, 62a2, and 62a3 are connected and the capacitance of the capacitor 62a connected to the coil 61 is maximum. On the Gauss plane, the reactance when only the capacitor 62a1 is connected is preferably in the inductive region, that is, $j\omega L61 > 1/(j\omega C62a1)$ and the reactance when all of the capacitors 62a1, 62a2, and 62a3 are connected is preferably in the capacitive region, that is, $j\omega L61 < 1/(j\omega(262a1+C62a2+C62a3))$.

When the capacitance of the capacitor 62a increases, the reactance transitions from the inductive region that is a positive value to the capacitive region that is a negative value, and crosses a zero point midway. This zero point is a resonance point, and a difference between the output voltage effective value Veout and the input voltage effective value Vein is a minimum. According to the present embodiment, the configuration is such that the capacitors 62a1, 62a2, and 62a3 are switched. However, a variable capacitance capacitor that meets a required rated voltage may be used.

Figure 8:
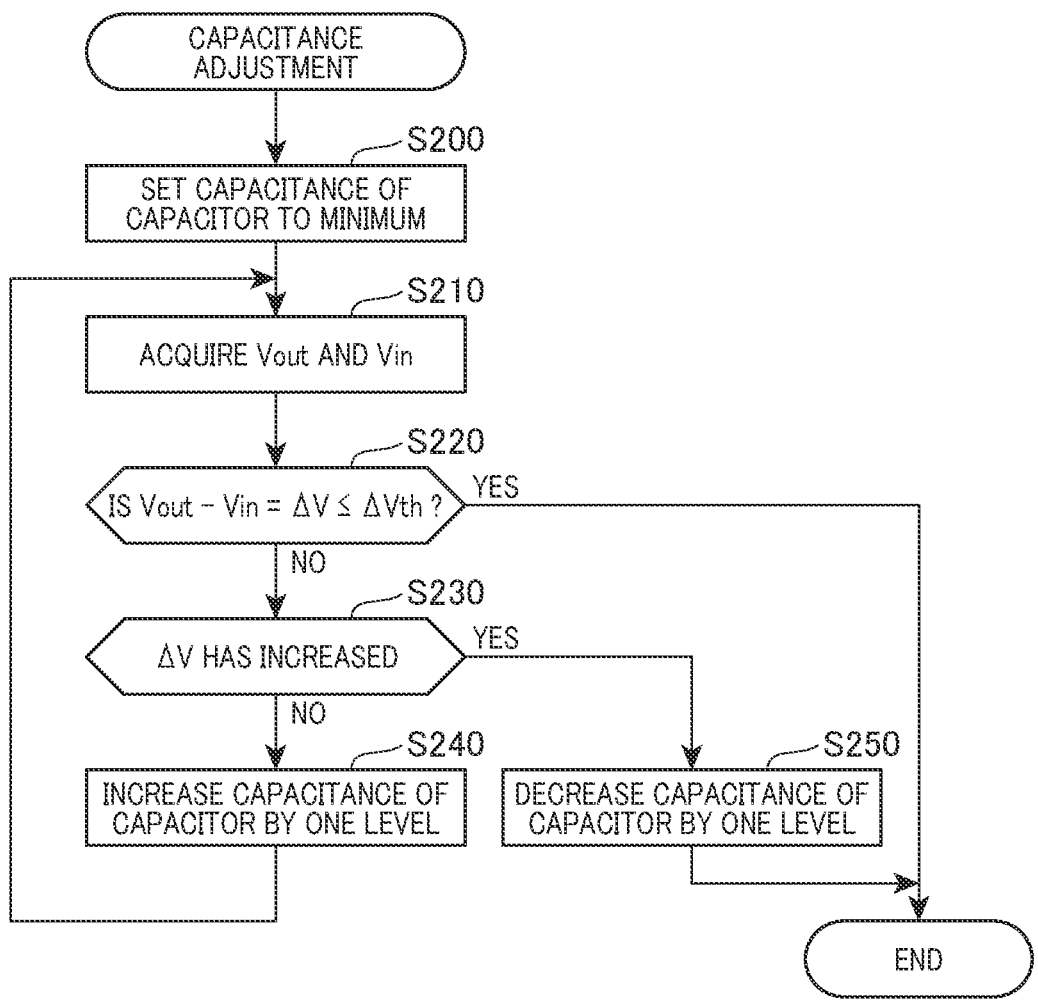
FIG. 8 is a flowchart of capacitance determination for a capacitor performed by a control apparatus.

FIG. 8 is a flowchart of capacitance determination for the capacitor 62a performed by the control apparatus 90. At step S200, the control apparatus 90 sets the capacitance of the capacitor 62a to be a minimum. In this state, a magnitude of the inductive reactance ($j\omega L61$) of the coil 61 is greater than a magnitude of the capacitive reactance ($1/(j\omega C62a)$) of the capacitor 62a.

At step S210, the control apparatus 90 acquires the output voltage Vout of the power conversion unit 20 and the input voltage Vin of the power transmission unit 80. At step S210, the control apparatus 90 acquires the output voltage effective value Veout from the output voltage Vout and the input voltage effective value Vein from the input voltage Vin. At step S220, the control apparatus 90 determines whether a voltage difference $\Delta V$ between the output voltage effective value Veout and the input voltage effective value Vein is equal to or less than a determination value $\Delta V$th.

For example, the determination value $\Delta V$th may be prescribed taking into consideration voltage drop due to the electrical resistance r72 of the transmission line 70. When the voltage difference $\Delta V$ is equal to or less than the determination value $\Delta V$th, the inductive reactance $j\omega L61$ of the coil 61 can be sufficiently canceled out by the current capacitive reactance of the capacitor 62. Therefore, the control apparatus 90 ends the process. When the voltage difference $\Delta V$ exceeds the determination value $\Delta V$th, the control apparatus 90 shifts the process to step S230.

At step S230, the control apparatus 90 determines whether the voltage difference $\Delta V$ in a current measurement has increased from the voltage difference $\Delta V$ in a previous measurement. When the voltage difference $\Delta V$ has not increased, the control apparatus 90 shifts the process to step S240. When the voltage difference $\Delta V$ has increased, the control apparatus 90 shifts the process to step S250. Here, when step S230 is processed for the first time, because the voltage difference $\Delta V$ in the previous measurement is not present, the control apparatus 90 proceeds to step S240.

At step S240, the control apparatus 90 switches the on/off states of the switching transistors tr1 to tr6, increases the capacitance of the capacitor 62a by one level, and subsequently shifts the process to step S210. At step S250, the control apparatus 90 switches the on/off states of the switching transistors tr1 to tr6, decreases the capacitance of the capacitor 62a by one level, and ends the process. A reason for this is that, when the voltage difference $\Delta V$ has increased, it can be considered that the capacitive reactance ($1/(j\omega C62a)$) of the capacitor 62a is excessively greater than the inductive reactance of the coil 61, the impedance therefore increases as a result of the capacitive reactance, and the input voltage effective value Vein decreases. In this case, the voltage difference $\Delta V$ between the output voltage effective value Veout and the input voltage effective value Vein can be minimized at the previous capacitance of the capacitor 62a.

Figure 9:
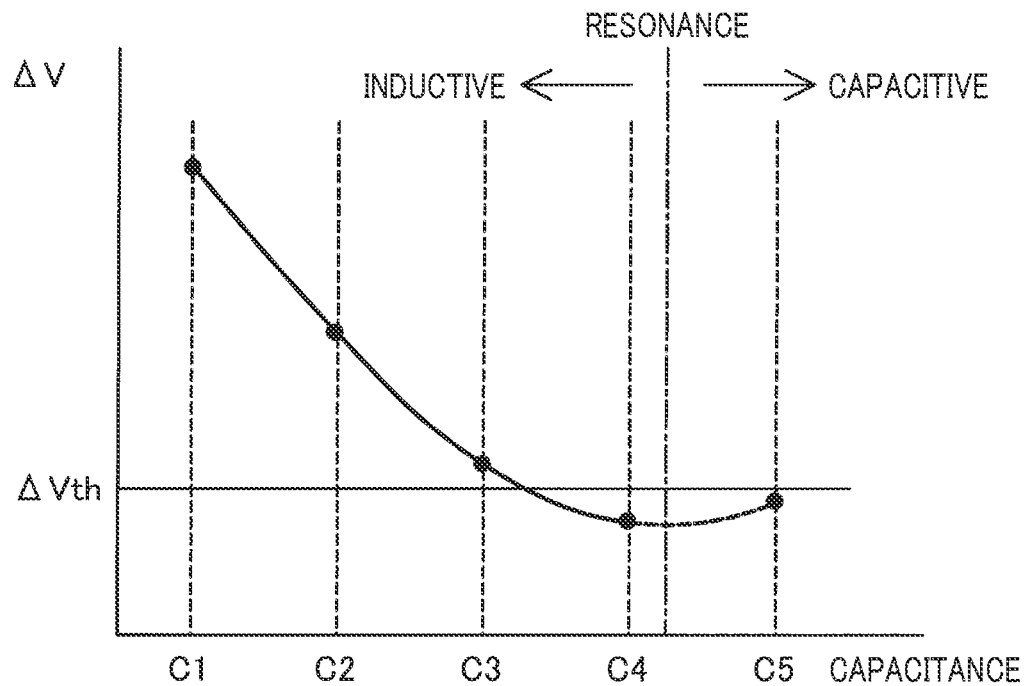
FIG. 9 is an explanatory diagram illustrating a relationship between a capacitance of the capacitor and a voltage difference.

FIG. 9 is an explanatory diagram of a relationship between the capacitance of the capacitor 62a and the voltage difference $\Delta V$. The control apparatus 90 switches the switching transistors tr1 to tr6 and increases the capacitance of the capacitor 62a from C1 to C2 and C3, one level at a time. When the capacitance of the capacitor 62a increases, the voltage difference $\Delta V$ decreases. When the capacitance of the capacitor 62a becomes C4, the voltage difference $\Delta V$ is equal to or less than the determination value $\Delta V$th. The control apparatus 90 uses C4 as the capacitance of the capacitor 62a.

Here, in the example shown in FIG. 9, when the capacitance of the capacitor 62a is greater than C4, the voltage difference $\Delta V$ increases after passing through a local minimum. The increase in voltage difference $\Delta V$ is due to the capacitive reactance of the capacitor 62a. In addition, according to the present embodiment, in the measurement values, a point at which the voltage difference $\Delta V$ initially becomes equal to or less than the determination value $\Delta V$th is further in the inductive region than a point at which the voltage difference $\Delta V$ becomes a local minimum. However, in the measurement values, the point at which the voltage difference $\Delta V$ initially becomes equal to or less than the determination value $\Delta V$th may be further in the capacitive region than the point at which the voltage difference $\Delta V$ becomes the local minimum.

Figure 10:
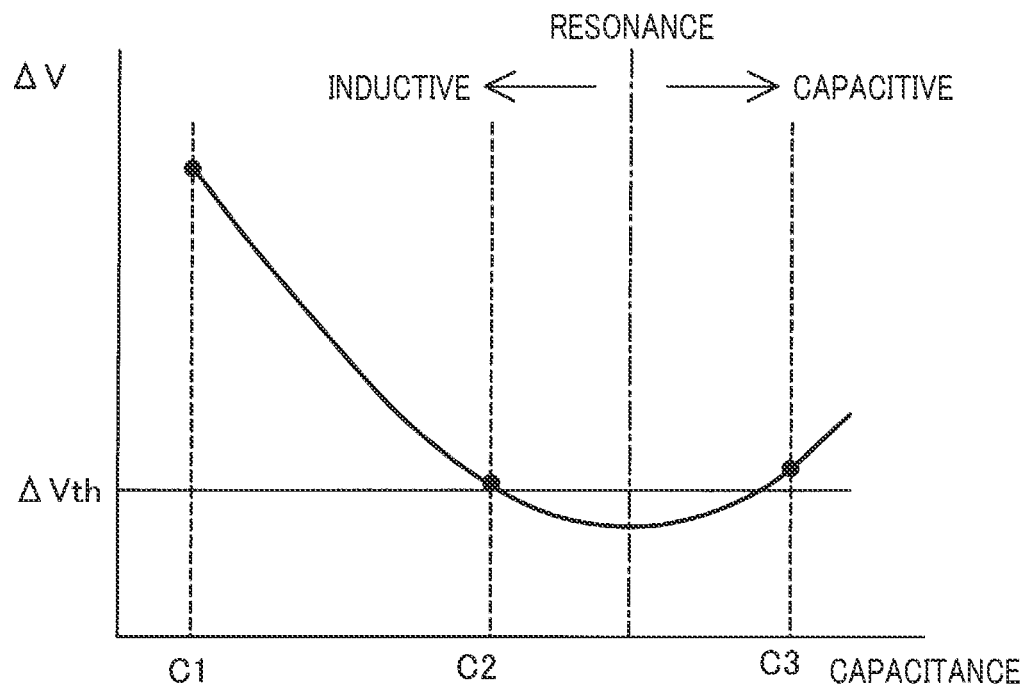
FIG. 10 is an explanatory diagram illustrating a relationship between the capacitance of the capacitor and the voltage difference.

FIG. 10 is an explanatory diagram of a relationship between the capacitance of the capacitor 62a and the voltage difference $\Delta V$. FIG. 10 differs from FIG. 9 in that, in the measurement values, a point at which the voltage difference $\Delta V$ becomes equal to or less than the determination value $\Delta V$th is not present. That is, FIG. 10 shows a case in which the determination at step S220 in FIG. 8 is "No" and the determination at step S230 is "Yes."

In the example shown in FIG. 10, a voltage difference $\Delta V(C2)$ when the capacitance of the capacitor 62a is C2 is greater than the determination value $\Delta V$th. A voltage difference ΔV(C3) when the capacitance of the capacitor 62*a* is C3 is also greater than the determination value ΔVth. In addition, the voltage difference ΔV(C3) is greater than the voltage difference ΔV(C2). In this case, the control apparatus 90 uses C2 as the capacitance of the capacitor 62*a*.

As shown in FIG. 10, this phenomenon may occur in a case in which the reactance when the capacitance of the capacitor 62*a* is C2 is in the inductive region and the reactance when the capacitance of the capacitor 62*a* is C3 is in the capacitive region. In addition, although not shown, this phenomenon may also occur in a case in which the reactance is in the capacitive region both when the capacitance of the capacitor 62*a* is C2 and C3.

As above, according to the second embodiment, the compensator 60*a* includes the three capacitors 62*a*1, 62*a*2, and 62*a*3 as the capacitor 62*a*. The control apparatus 90 performs switching using the switching transistors tr1 to tr6 such that at least one or more among the three capacitors 62*a*1, 62*a*2, and 62*a*3 is connected as the capacitor 62*a*, based on the difference between the output voltage effective value Veout and the input voltage effective value Vein. As a result, the control apparatus 90 can acquire the output voltage effective value Veout and the input voltage effective value Vein, and perform control to minimize the effects of the inductive reactance of the transmission line 70. Consequently, the inductive reactance of the coil 61 can be canceled out by the capacitive reactance of the capacitor 62*a*, and the effects of changes in the inductive reactance caused by changes in the shape of the transmission line 70 and the like can be avoided.

According to the present embodiment, a switching transistor that is a MOS-FET is used as a switch. However, a contact-type switch of other semiconductors, such as a TRIAC or a relay, may be used.

According to the present embodiment, the three capacitors 62*a*1, 62*a*2, and 62*a*3 are used. However, m capacitors (m being a natural number of 2 or greater) may be provided. In addition, n coils (n being a natural number of 2 or greater) may be provided and the number of coils 61 to be connected may be adjusted. When both are combined, the compensator 60*a* may include the n coils that are the inductive reactance elements, the m capacitors (n and m being natural numbers of which at least either is 2 or greater), and switches that change a combination of the n coils and the m capacitors.

The control apparatus 90 may control switching of the switches using the output voltage effective value Veout and the input voltage effective value Vein, and control the combination of the n coils and the m capacitors. At this time, the output voltage effective value Veout and the input voltage effective value Vein may be acquired for all combinations of the n coils and the m capacitors, and the combination of the coil and the capacitor in which the difference between the output voltage effective value Veout and the input voltage effective value Vein is a minimum may be used.

Third Embodiment

Figure 11:
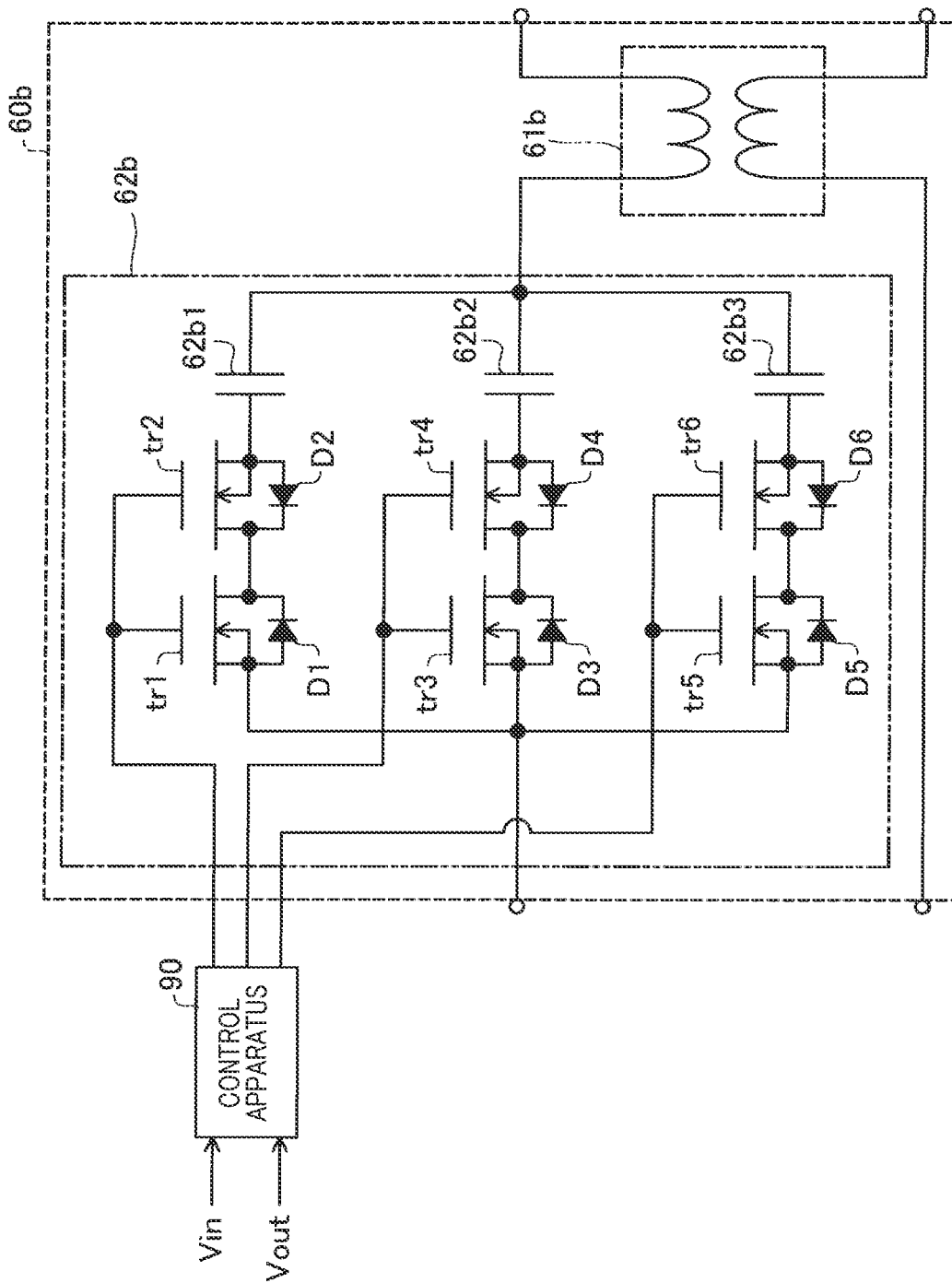
FIG. 11 is a circuit diagram of a compensator according to a third embodiment.

FIG. 11 is a circuit diagram of a compensator 60*b* according to a third embodiment. Whereas the compensator 60*a* according to the second embodiment uses the coil 61 as the inductive reactance element, according to the third embodiment, the compensator 60*b* uses a common mode choke coil 61*b* as the inductive reactance element. The common mode choke coil 61*b* is used as a noise filter for removing high-frequency noise of the power conversion unit 20. The common mode choke coil 61*b* has two coils wrapped around an iron core and therefore has inductance. The common mode choke coil 61*b* can be made to function as the inductive reactance element. A configuration of a capacitor 62*b* of the compensator 60*b* is the same as the configuration of the capacitor 62*a* of the compensator 60*a* according to the second embodiment.

As above, according to the third embodiment as well, the compensator 60*b* includes three capacitors 62*b*1, 62*b*2, and 62*b*3 as the capacitor 62*b*. The control apparatus 90 performs switching using the switching transistors tr1 to tr6 such that at least one or more among the three capacitors 62*b*1, 62*b*2, and 62*b*3 is connected as the capacitor 62*b*, based on the difference between the output voltage effective value Veout and the input voltage effective value Vein.

As a result, in a manner similar to that according to the second embodiment, the control apparatus 90 can acquire the output voltage effective value Veout and the input voltage effective value Vein, and perform control to minimize the effects of the inductive reactance of the transmission line 70. Consequently, the inductive reactance of the coil 61 can be canceled out by the capacitive reactance of the capacitor 62*b*, and the effects of changes in the inductive reactance caused by changes in the shape of the transmission line 70 and the like can be avoided.

Fourth Embodiment

Figure 12:
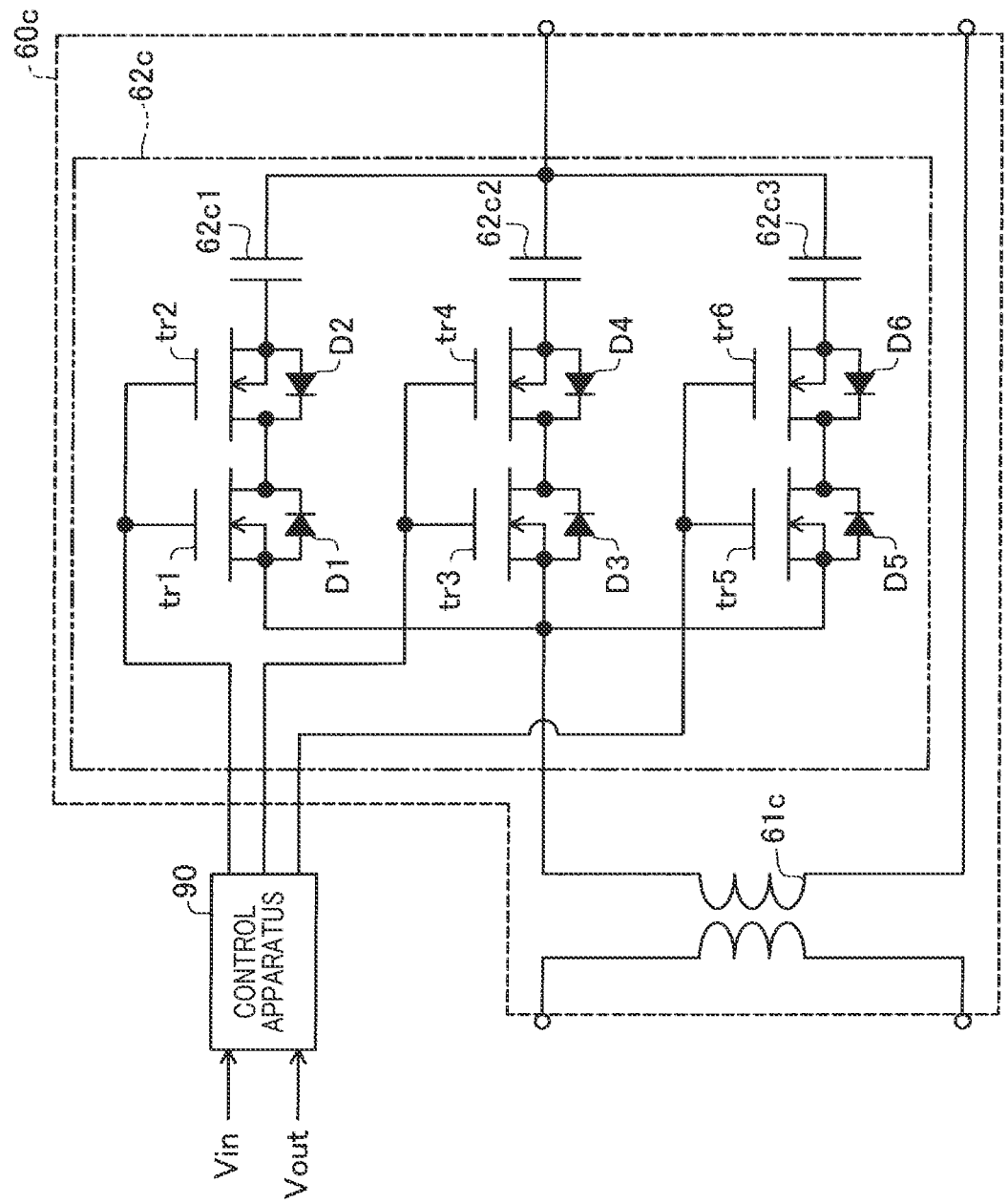
FIG. 12 is a circuit diagram of a compensator according to a fourth embodiment.

FIG. 12 is a circuit diagram of a compensator 60*c* according to a fourth embodiment. Whereas the compensator 60*a* uses the coil 61 as the inductive reactance element according to the second embodiment, according to the fourth embodiment, the compensator 60*c* uses a transformer 61*c* as the inductive reactance element. The transformer 61*c* has a structure in which two coils are wrapped around an iron core and therefore has inductance. The transformer 61*c* can be made to function as the inductive reactance element. A configuration of a capacitor 62*c* of the compensator 60*b* is the same as the configuration of the capacitor 62*a* of the compensator 60*a* according to the second embodiment.

As above, according to the fourth embodiment, the compensator 60*b* includes three capacitors 62*c*1, 62*c*2, and 62*c*3 as the capacitor 62*c*. The control apparatus 90 performs switching using the switching transistors tr1 to tr6 such that at least one or more among the three capacitors 62*c*1, 62*c*2, and 62*c*3 is connected as the capacitor 62*c*, based on the difference between the output voltage effective value Veout and the input voltage effective value Vein.

As a result, in a manner similar to that according to the second embodiment, the control apparatus 90 can acquire the output voltage effective value Veout and the input voltage effective value Vein, and perform control to minimize the effects of the inductive reactance of the transmission line 70. Consequently, the inductive reactance of the coil 61 can be canceled out by the capacitive reactance of the capacitor 62*b*, and the effects of changes in the inductive reactance caused by changes in the shape of the transmission line 70 and the like can be avoided.

Fifth Embodiment

Figure 13:
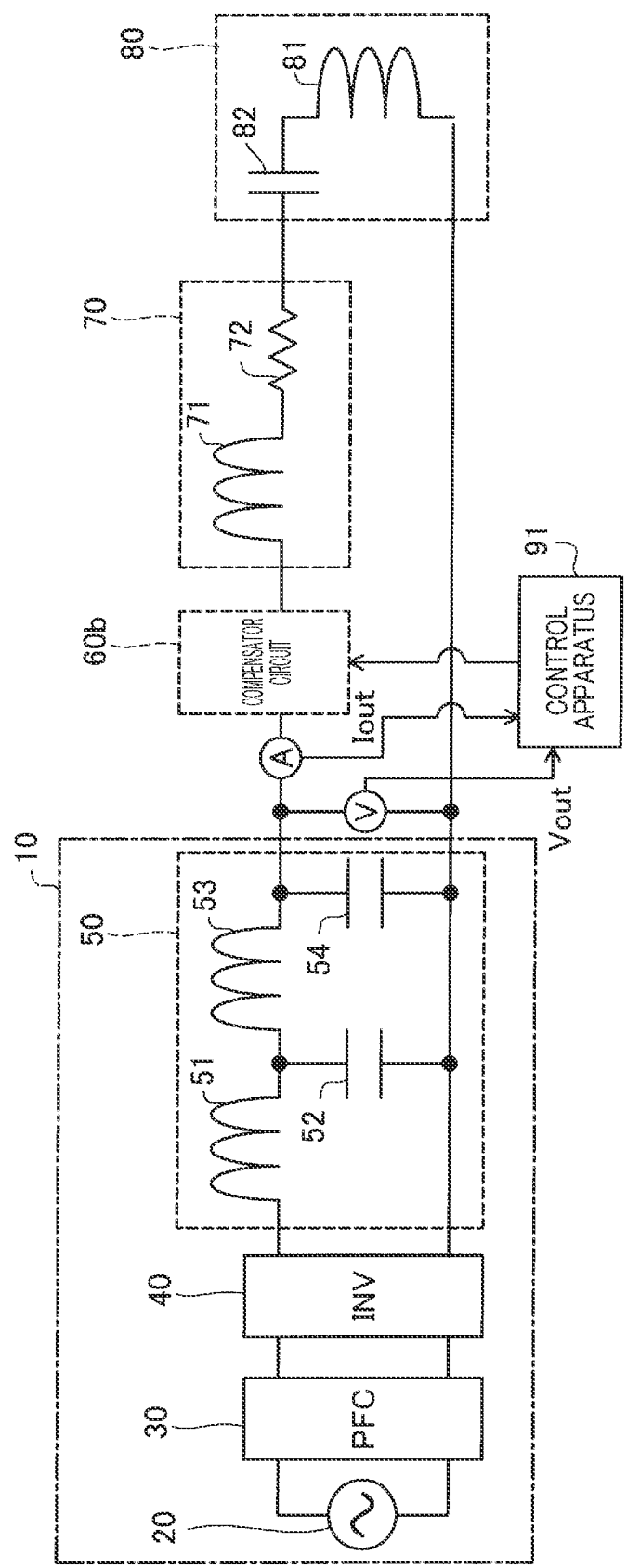
FIG. 13 is an equivalent circuit diagram of a power transmission apparatus according to a fifth embodiment.

FIG. 13 is an equivalent circuit diagram of a power transmission apparatus according to a fifth embodiment. According to the second embodiment, the control apparatus 90 performs switching using the switching transistors tr1 to tr6 such that at least one or more among the three capacitors 62*a*1, 62*a*2, and 62*a*3 is connected as the capacitor 62*a*, based on the difference between the output voltage effective value Veout and the input voltage effective value Vein. The fifth embodiment differs in that a control apparatus 91 performs switching using the switching transistors tr1 to tr6 such that at least one or more among the three capacitors 62a1, 62a2, and 62a3 is connected as the capacitor 62a, based on a difference between a phase of the output voltage Vout outputted from the power conversion unit 20 and a phase of an output current Iout outputted from the power conversion unit 20.

Figure 14:
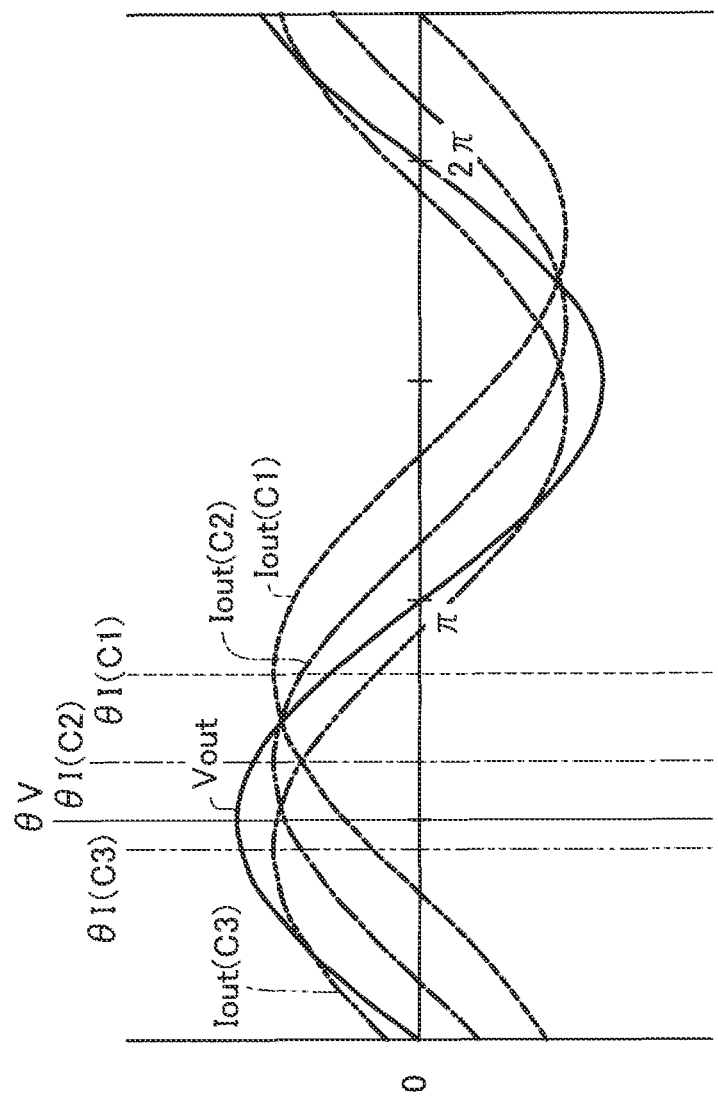
FIG. 14 is a graph illustrating a voltage and a current when a capacitance of a capacitor is changed.

FIG. 14 is a graph of the output voltage and the output current Iout when the capacitance of the capacitor 62a is changed. A phase of an output current Iout(C1) when the coil 61 is connected to the compensator 60a and the capacitance of the capacitor 62 is C1 is later than the phase of the output voltage Vout. For example, a phase θV at which the output voltage Vout is a local maximum may be later than a phase θI(C1) at which the output current Iout(C1) is a local maximum. When the capacitance of the capacitor 62 increases from C1 to C2, a phase θI(C2) at which an output current Iout(C2) is a local maximum advances and approaches the phase θV at which the output voltage Vout is the local maximum. Furthermore, when the capacitance of the capacitor 62 increases to C3, a phase θI(C3) at which an output current Iout(C3) is a local maximum advances further than the phase θV at which the output voltage Vout is the local maximum.

Here, when the capacitance of the capacitor 62 increases beyond C3, the phase at which the output current Iout is the local maximum advances further than the phase θI at which the output current Iout(C3) becomes the local maximum. Here, the phase difference between the phase θV at which the output voltage Vout becomes the local maximum and the phase θI(C3) at which the output current Iout(C3) becomes the local maximum is less than the phase difference between the phase θV at which the output voltage Vout becomes the local maximum and the phase θI(C2) at which the output current Iout(C2) becomes the local maximum. Therefore, the phase difference between the phase θV at which the output voltage Vout becomes the local maximum and the phase θI(C3) at which the output current Iout(C3) becomes the local maximum is a minimum. Consequently, the control apparatus 91 uses C3 as the capacitance of the capacitor 62a.

As above, according to the fifth embodiment, the compensator 60a includes the three capacitors 62a1, 62a2, and 62a3 as the capacitor 62a. The control apparatus 91 performs switching using the switching transistors tr1 to tr6 such that at least one or more among the three capacitors 62a1, 62a2, and 62a3 is connected as the capacitor 62a, based on a difference between the phase of the output voltage Vout outputted from the power conversion unit 20 and the phase of the output current Iout outputted from the power conversion unit 20. As a result, the control apparatus 91 can perform control to minimize the effects of the inductive reactance of the transmission line 70. Consequently, the inductive reactance of the coil 61 can be canceled out by the capacitive reactance of the capacitor 62a, and the effects of changes in the inductive reactance caused by changes in the shape of the transmission line 70 and the like can be avoided.

Sixth Embodiment

Figure 15:
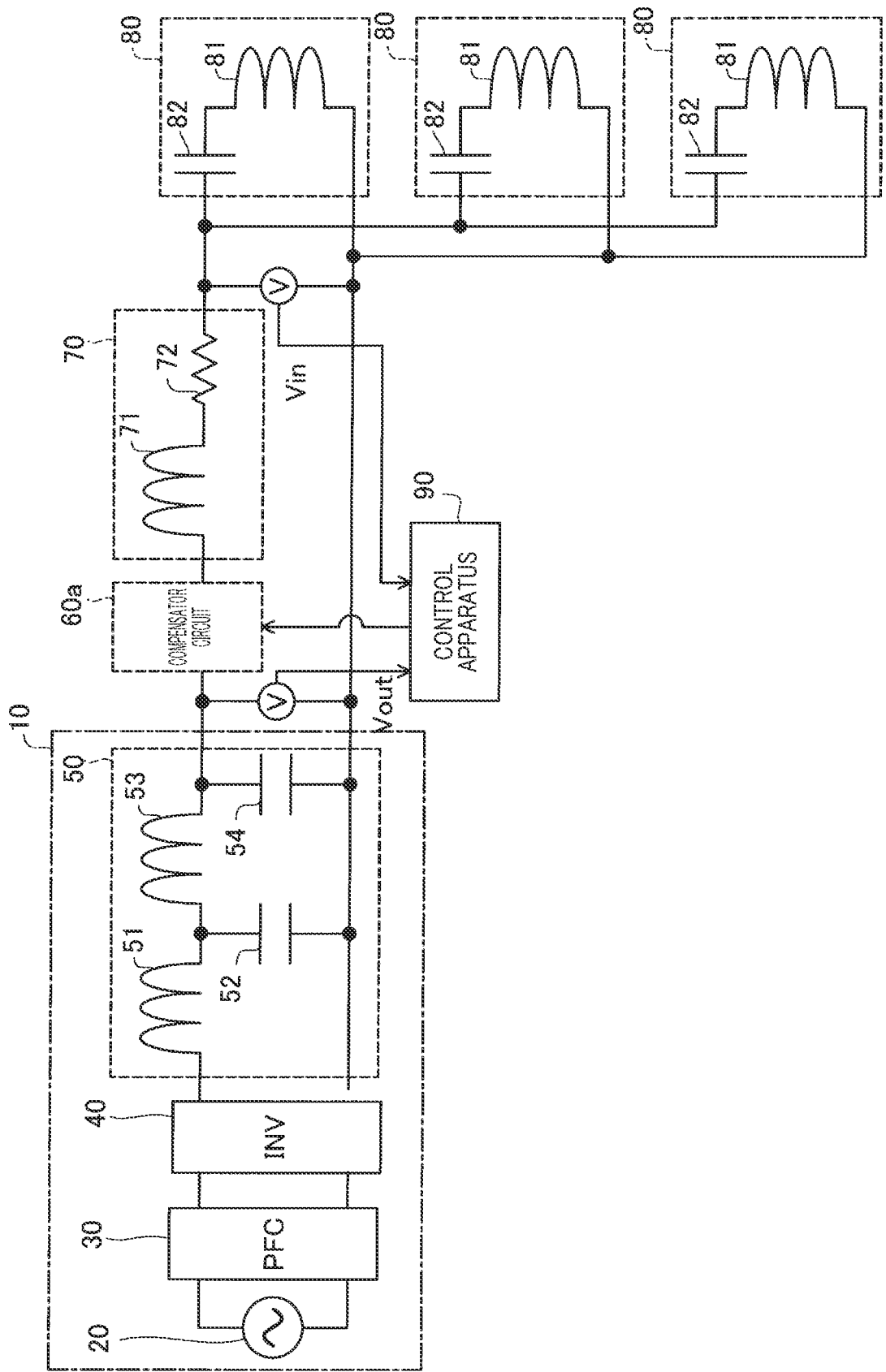
FIG. 15 is an equivalent circuit diagram of a power transmission apparatus according to a sixth embodiment.

FIG. 15 is an equivalent circuit diagram of a power transmission apparatus according to a sixth embodiment. The sixth embodiment differs from the first to fifth embodiment in that a plurality of power transmission units 80 are connected to a single transmission line 70. However, the configuration of the transmission line according to the sixth embodiment is similar to that according to the first to fifth embodiments. Therefore, in a manner similar to that according to the first to fifth embodiments, the comparator 60 has the inductive reactance element (coil 61) and the capacitor 62 that are connected in series, the inductive reactance element having an inductive reactance ($j\omega L61$) that is greater than an inductive reactance ($j\omega L71$) of the transmission line 70.

Therefore, the inductive reactance of the transmission line 70 can be substantially ignored and the inductive reactance of the coil 61 can be canceled out by the capacitive reactance of the capacitor 62. As a result, the effects of changes in the inductive reactance caused by changes in the shape of the transmission line 70 and the like can be avoided. In addition, the capacitance of the capacitor 62 required to cancel out the inductive reactance ($j\omega L71$) of the transmission line 70 when the coil 61 is not provided is $1/(\omega^2 L71)$, and the capacitance of the capacitor 62 required to cancel out the inductive reactance ($j\omega(L71+L61)$) of the transmission line 70 and the compensator 60 when the coil 61 is provided is $1/(\omega^2(L71+L61))$. Therefore, when the coil 61 is provided, the capacitance of the capacitor 62 can be less than that when the coil 61 is not provided.

According to the above-described first to fourth embodiments and sixth embodiment, the output voltage effective value Veout of the output voltage Vout from the power conversion unit 20 and the input voltage effective value Vein of the input voltage Vin of the power transmission unit 80 are used. However, a peak value of the output voltage Vout from the power conversion unit 20 and a peak value of the input voltage Vin of the power transmission unit 80 may be used.

According to the above-described third to sixth embodiments, an appropriate capacitance of the capacitor is automatically set by the control apparatuses 90 and 91 switching the switching elements. However, the capacitance may be set manually in a manner similar to that according to the first embodiment.

According to the above-described embodiments, arbitrary embodiments may be carried out in combination as long as a combination of the second embodiment and the fifth embodiment and a combination of the third embodiment and the fourth embodiment are not included.

The power transmission coil 81 and the capacitor 82 of the power transmission unit 80 according to the first to sixth embodiments are connected in series but may be connected in parallel. In addition, the coil 61 and the capacitor 62 of the compensator circuit 60 according to the first to sixth embodiment are connected in series but may be connected in parallel. Furthermore, the compensator circuit 60 may be configured by a plurality of coils and capacitors. In a similar manner, the inductive reactance of the transmission line can be substantially ignored.

Here, the present disclosure can be actualized according to various aspects. For example, in addition to the power transmission apparatus, the present disclosure can be actualized according to aspects such as an adjustment method of the power transmission apparatus and a contactless (wireless) power supply system.

The present disclosure is not limited to the above-described embodiments and can be actualized through various configurations without departing from the spirit of the disclosure. For example, technical features according to embodiments that correspond to technical features in each aspect described in the summary of the invention can be replaced and combined as appropriate to solve some or all of the above-described issued or to achieve some or all of the above-described effects. Furthermore, the technical features may be omitted as appropriate unless described as a requisite in the present specification.

What is claimed is:

1. A power transmission apparatus that supplies power to a power reception apparatus without contact therebetween, the power transmission apparatus comprising:
   a power conversion unit that outputs an alternating-current voltage of a predetermined frequency;
   a power transmission unit that has a power transmission coil and a capacitor that is connected to the power transmission coil;
   a transmission line that connects the power conversion unit and the power transmission unit; and
   a compensator that is disposed between the power conversion unit and the transmission line, wherein
   the compensator includes
      an inductive reactance element that has an inductive reactance that is greater than an inductive reactance of the transmission line, and
      a capacitor that reduces an inductive reactance that is a sum of an inductive reactance of the transmission line and an inductive reactance of the inductive reactance element, wherein the inductive reactance element and the capacitor of the compensator are connected.

2. The power transmission apparatus according to claim 1, wherein:
   a capacitance of the capacitor of the compensator is a capacitance that generates a capacitive reactance capable of canceling out the inductive reactance that is the sum of the inductive reactance of the transmission line and the inductive reactance of the inductive reactance element.

3. The power transmission apparatus according to claim 1, wherein:
   an inductance of the inductive reactance element and a capacitance of the capacitor of the compensator are determined based on an output voltage of the power conversion unit and an input voltage of the power transmission unit.

4. The power transmission apparatus according to claim 3, wherein:
   the inductance of the inductive reactance element and the capacitance of the capacitor of the compensator are an inductance and a capacitance at which a difference between the output voltage and the input voltage is equal to or less than a determination value.

5. The power transmission apparatus according to claim 3, wherein:
   the compensator includes
      n inductive reactance elements (n being a natural number),
      m capacitors (m being a natural number, where at least either of n and m is 2 or greater), and
      a switch that changes a combination of the n inductive reactance elements and the m capacitors.

6. The power transmission apparatus according to claim 5, further comprising:
   a control apparatus that controls switching of the combination of the n inductive reactance elements and the m capacitors by the switch such that a voltage difference between the output voltage and the input voltage is equal to or less than a determination value.

7. The power transmission apparatus according to claim 1, wherein:
   an inductance of the inductive reactance element and a capacitance of the capacitor of the compensator are determined based on an output voltage of the power conversion unit and an output current outputted from the power conversion unit.

8. The power transmission apparatus according to claim 7, wherein:
   the inductance of the inductive reactance element and the capacitance of the capacitor of the compensator are an inductance and a capacitance at which a difference between a phase of the output voltage and a phase of the output current is equal to or less than a determination value.

9. The power transmission apparatus according to claim 7, wherein:
   the compensator includes
      n inductive reactance elements (n being a natural number),
      m capacitors (m being a natural number, where at least either of n and m is 2 or greater), and
      a switch that changes a combination of the inductive reactance elements and the capacitors.

10. The power transmission apparatus according to claim 9, further comprising:
    a control apparatus that controls switching of the combination of the n inductive reactance elements and the m capacitors by the switch such that a difference between a phase of the output voltage and a phase of the output current is equal to or less than a determination value.

11. The power transmission apparatus according to claim 5, wherein:
    the switch is a semiconductor switch.

12. The power transmission apparatus according to claim 1, wherein:
    the inductive reactance element is a coil or a transformer.

13. The power transmission apparatus according to claim 1, wherein:
    the compensator has a noise filter for removing high-frequency noise of the power conversion unit, the noise filter including a coil; and
    the coil of the noise filter is used as the inductive reactance element.

14. The power transmission apparatus according to claim 1, wherein:
    two or more power transmission units are connected to a single power conversion unit.

15. An adjustment method of a power transmission apparatus that supplies power from a power conversion unit to a power transmission unit through a transmission line, the power conversion unit outputting an alternating-current voltage, and the power transmission unit including a power transmission coil and a capacitor connected to the power transmission coil, the adjustment method comprising:
    disposing, between the power conversion unit and the transmission line, a compensator that includes an inductive reactance element that has an inductive reactance that is greater than an inductive reactance of the transmission line and a capacitor;
    measuring an output voltage of the power conversion unit and an input voltage of the power transmission unit; and
    adjusting an inductance of the inductive reactance element and a capacitance of the capacitor of the compensator based on the output voltage and the input voltage.

16. The adjustment method for a power transmission apparatus according to claim 15, wherein:
the inductance of the inductive reactance element and the capacitance of the capacitor of the compensator are adjusted such that a difference between the output voltage and the input voltage is equal to or less than a determination value.

17. An adjustment method for a power transmission apparatus that supplies power from a power conversion unit to a power transmission unit through a transmission line, the power conversion unit outputting an alternating-current voltage, and the power transmission unit including a power transmission coil and a capacitor connected to the power transmission coil, the adjustment method comprising:
disposing, between the power conversion unit and the transmission line, a compensator that includes an inductive reactance element that has an inductive reactance that is greater than an inductive reactance of the transmission line and a capacitor;
measuring an output voltage outputted from the power conversion unit and an output current outputted from the power conversion unit; and
adjusting an inductance of the inductive reactance element and a capacitance of the capacitor of the compensator based on the output voltage and the output current.

18. The adjustment method for a power transmission apparatus according to claim 17, wherein:
the inductance of the inductive reactance element and the capacitance of the capacitor of the compensator are adjusted such that a difference between a phase of the output voltage and a phase of the output current is equal to or less than a determination value.

* * * * *